J. V. WEITZ.
Hydrants.

No. 156,864. Patented Nov. 17, 1874.

Witnesses.
A. F. Cornell.
S. C. Ames.

Inventor.
J. V. Weitz
Per Burridge & Co.
Attorneys

UNITED STATES PATENT OFFICE.

JOHN V. WEITZ, OF CLEVELAND, OHIO.

IMPROVEMENT IN HYDRANTS.

Specification forming part of Letters Patent No. 156,864, dated November 17, 1874; application filed August 28, 1874.

*To all whom it may concern:*

Be it known that I, JOHN V. WEITZ, of Cleveland, in the county of Cuyahoga and State of Ohio, have invented a certain new and Improved Hydrant, of which the following is a clear, full, and complete description, reference being had to the accompanying drawings, making a part of this specification, in which—

Figure 1:
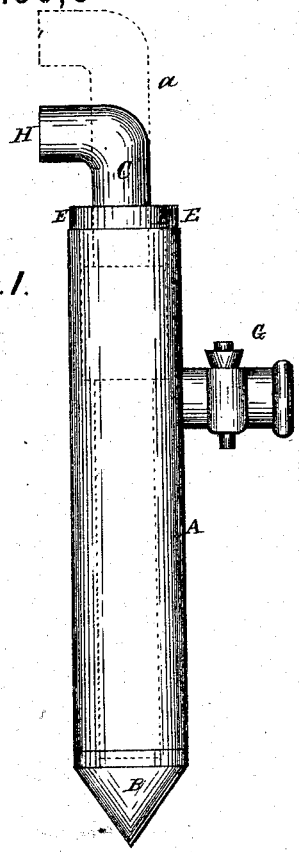
Figure 2:
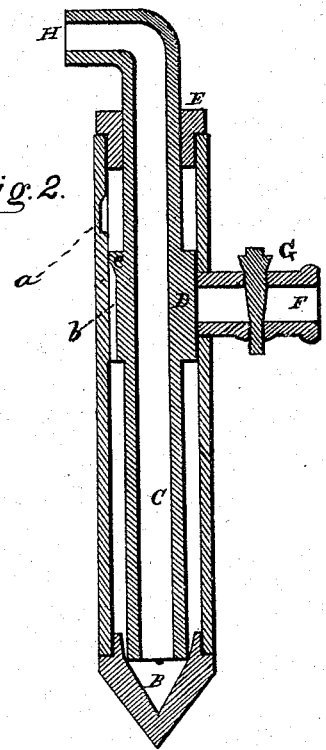
Figure 3:
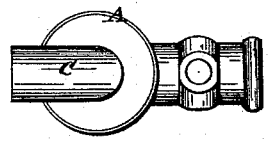

Figure 1 is a side view of the hydrant. Fig. 2 is a vertical transverse section. Fig. 3 is an end view.

Like letters of reference refer to like parts in the several views.

This invention has for its object the cooling of water taken from ordinary hydrants at the surface of the ground, by conveying it down into the earth sufficiently far to reduce the temperature of the water to a palatable degree, thereby dispensing with ice for cooling water to a degree pleasant to drink.

A further and more full description of the invention is as follows: A represents a section of pipe, the lower end of which is closed and terminated by a point, B. In said pipe is fitted a smaller one, C, made to retain a central relation to the pipe A by the enlargement or piston D, which fills the bore of the pipe in a free but water-tight manner. The upper end of the tube C projects, from the pipe A, through a stuffing-box, E, whereby it is made water-tight. In the side of the inside of the pipe A is made a recess, $a$. In the side of the enlargement D is made a corresponding recess, $b$, the purpose whereof will presently be shown.

The practical operation of the above-described device is as follows: The pipe A, which may be some fifty or sixty feet in length, more or less, is driven into the ground, the point B forcing the way for the pipe to follow, until the induction-pipe or arm F is a few feet below the surface, convenient to be attached to the water-pipe. The inner pipe or tube C is now inserted, and continued therefrom to above the ground. Water is admitted into the pipe A through the pipe F, which is connected to the water-pipe.

The position of the enlargement D of the tube C, as shown in the drawing, is such as to close the pipe F. Hence, in order to allow the water to flow into the pipe A, the tube C is drawn upward, as indicated by the dotted lines $a$ in Fig. 1, so far as to bring the lower end of the enlargement above the bore of the pipe F. Water will now run into the pipe A, filling it up to the enlargement. This body of water in the pipe is shut off from the supply-pipe by a cock, G, operated by a rod attached thereto, and extending to the surface of the ground.

The water in the pipes A, in consequence of being low down in the ground, will become sufficiently cool for drinking purposes, and which is had by forcing down the tube C into the pipe. The enlargement D, acting as a piston, forces the water up through the tube, from which it is discharged at the mouth H.

In the event any water should find its way into the space above the piston or enlargement D, it will flow therefrom into the reservoir or lower part of the pipe A, through the recesses $a$ and $b$.

When the piston is at the highest part of its stroke the recesses $a$ $b$ are in open relation to each other, as indicated by the dotted lines in Fig. 1, so that the water above the piston D can run down, through the open recesses, into the pipe below the piston. The recesses register at the upper stroke of the piston, and then communication is cut off by the projection $c$ upon the descent of the piston, which fills the bore of the pipe.

By the use of the above device the warm unpalatable water from the hydrant or main is made cool and fit to drink, thereby dispensing with ice used for this purpose.

Although this device is intended for summer use it is also useful in winter for warming the cold water from the hydrant by having it remain for a time in the earth, which, for the reason of being warmer than the water, will raise its temperature to a pleasant degree for bathing, drinking, &c.

In either case the operation of the device is the same.

What I claim as my invention, and desire to secure by Letters Patent, is—

The tube C, provided with an enlargement or piston, D, having in the side thereof a recess, $b$, in combination with the pipe A, provided with a recess, $a$, and induction-pipe F, substantially in the manner as described, and for the purpose specified.

JOHN V. WEITZ.

Witnesses:
 W. H. BURRIDGE,
 DAVID FALCONER.